United States Patent
Lee (10) Patent No.: US 12,159,615 B2
(45) Date of Patent: Dec. 3, 2024

(54) APPARATUS AND METHOD FOR CONTROLLING VIRTUAL ENGINE SOUND

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 262 days.

(21) Appl. No.: 17/817,320

(22) Filed: Aug. 3, 2022

(65) Prior Publication Data

US 2023/0169952 A1 Jun. 1, 2023

(30) Foreign Application Priority Data

Nov. 29, 2021 (KR) ........................ 10-2021-0166930

(51) Int. Cl.
*G10K 15/04* (2006.01)
*B60W 40/105* (2012.01)
*G06V 20/58* (2022.01)

(52) U.S. Cl.
CPC ........... *G10K 15/04* (2013.01); *B60W 40/105* (2013.01); *B60W 2420/403* (2013.01); *B60W 2554/4029* (2020.02); *B60W 2554/4041* (2020.02); *G06V 20/58* (2022.01)

(58) Field of Classification Search
CPC ...... G10K 15/04; G10K 15/02; G10K 11/346; B60W 40/105; B60W 2420/403; B60W 2554/4029; B60W 2554/4041; G06V 20/58; B60Q 5/008; B60Q 1/0023; B60Q 5/006; B60Q 2300/112; B60Q 2300/45; B60Y 2200/91; B60Y 2306/11
See application file for complete search history.

(56) References Cited

U.S. PATENT DOCUMENTS

| | | | | |
|---|---|---|---|---|
| 6,229,899 B1* | 5/2001 | Norris | ..................... | G10K 15/02 381/79 |
| 6,694,033 B1* | 2/2004 | Rimell | ..................... | H04S 3/00 380/22 |
| 10,766,479 B2* | 9/2020 | Galang | .................. | B60W 10/06 |

(Continued)

FOREIGN PATENT DOCUMENTS

| | | | | |
|---|---|---|---|---|
| JP | 2010208439 A | * | 9/2010 | ............. B60Q 5/008 |
| KR | 10-0638960 | | 10/2006 | |

(Continued)

OTHER PUBLICATIONS

English Language Abstract of 10-0638960 published Oct. 19, 2006.

*Primary Examiner* — Oyesola C Ojo
(74) *Attorney, Agent, or Firm* — DLA Piper LLP US (57) ABSTRACT

An apparatus for controlling virtual engine sound, which includes a sensor unit configured to detect a position of a pedestrian in front of a vehicle, a speaker unit configured to output a virtual engine sound in all directions of the vehicle or output a sound guidance message only to the position of the pedestrian, and a control unit configured to cause the speaker unit to operate in either a virtual engine sound system (VESS) mode or a pedestrian communication mode in which the sound guidance message is transmitted only to the pedestrian's position, by changing a sound focal point output through the speaker unit.

9 Claims, 8 Drawing Sheets

(56) References Cited

U.S. PATENT DOCUMENTS

| | | | |
|---|---|---|---|
| 11,632,644 B2* | 4/2023 | Bracht | H04R 3/12 381/303 |
| 2008/0273722 A1* | 11/2008 | Aylward | H04S 7/302 381/302 |
| 2008/0273723 A1* | 11/2008 | Hartung | H04R 1/403 381/302 |
| 2009/0296954 A1* | 12/2009 | Hooley | H04R 3/005 381/80 |
| 2012/0166042 A1* | 6/2012 | Kokido | B60Q 5/008 701/36 |
| 2013/0114827 A1* | 5/2013 | Lee | B60Q 5/008 381/86 |
| 2015/0127191 A1* | 5/2015 | Misra | G08G 1/056 701/1 |
| 2015/0151680 A1* | 6/2015 | Park | B60Q 5/008 381/86 |
| 2016/0046234 A1* | 2/2016 | Kim | G10K 15/02 381/86 |
| 2016/0052448 A1* | 2/2016 | Lee | G10K 1/074 116/37 |
| 2016/0118037 A1* | 4/2016 | Yun | G10K 11/17873 381/71.4 |
| 2017/0129397 A1* | 5/2017 | Gee | B60Q 5/008 |
| 2017/0151907 A1* | 6/2017 | Sakamoto | G10K 15/02 |
| 2019/0111839 A1* | 4/2019 | Lee | G06N 20/00 |
| 2019/0385584 A1* | 12/2019 | Han | G10K 11/17823 |
| 2019/0392811 A1* | 12/2019 | Lee | H04R 3/00 |
| 2021/0138959 A1* | 5/2021 | Soni | G08G 1/16 |

FOREIGN PATENT DOCUMENTS

| | | | | |
|---|---|---|---|---|
| KR | 20120077630 A | * | 7/2012 | B60Q 5/001 |
| KR | 20140080317 A | * | 6/2014 | B60R 21/34 |
| KR | 20170006179 A | * | 1/2017 | B60Q 5/008 |

* cited by examiner

FOCAL POINT

FIG.3B

DELAY TIME

FIG.4A

FOCAL POINT

FIG.4B

DELAY TIME

APPARATUS AND METHOD FOR CONTROLLING VIRTUAL ENGINE SOUND

CROSS-REFERENCE TO RELATED APPLICATION

This application claims priority from and the benefit of Korean Patent Application No. 10-2021-0166930, filed on Nov. 29, 2021, which is hereby incorporated by reference for all purposes as if set forth herein.

BACKGROUND

Field

Exemplary embodiments of the present disclosure relate to an apparatus and method for controlling virtual engine sound, and more particularly, to an apparatus and method for controlling virtual engine sound, which use an annular array-shaped beam focusing directional speaker to change a sound focal point, thereby enabling the speaker to operate in a virtual engine sound system (VESS) mode or in a pedestrian communication mode in which a guidance sound is transmitted only to a specific position with pedestrians.

Discussion of the Background

In general, an electric vehicle, such as an electric vehicle (EV), a hybrid electric vehicle (HEV), a plug-in hybrid electric vehicle (PHEV), or a fuel cell electric vehicle (FCEV), is an eco-friendly vehicle that may reduce exhaust gas and improve fuel consumption efficiency by combining an electric motor with an engine such as gasoline or diesel and allowing both power sources (electric motor and engine) to individually operate in an area where their respective characteristics may be exhibited depending on driving conditions Such an electric vehicle generates no engine sound since it uses an electric motor as a power source while traveling at low speed, which causes the vehicle to generate very low noise. Hence, there is a risk that a safety accident may occur due to the inability of pedestrians (especially, who are visually impaired) to recognize approaching vehicles.

To improve this issue, a virtual engine sound system (VESS) has been developed that outputs a virtual engine sound, namely, a pedestrian protection sound, when a vehicle travels at low speed or reverses, thereby enabling pedestrians (blind, elderly, low-hearing people, etc.) to easily recognize the approach of vehicles. Moreover, many countries have made it mandatory for electric vehicles to be equipped with a virtual engine sound system (VESS) that artificially outputs engine noise.

Meanwhile, the performance of autonomous vehicles that have been recently released is improving.

If such autonomous vehicles have an advanced autonomous driving function intended to operate even in a city environment with intersections or the like, the interaction with pedestrians must also be taken into account. Accordingly, communication lighting has been introduced to mimic the process of non-verbal communication between pedestrians and drivers.

The communication lighting is a technology for lighting (for example, for lighting signs and images such as a crosswalk) on the road surface to indicate whether an autonomous vehicle recognizes a pedestrian and the intention of the autonomous vehicle to wait for a pedestrian to cross the road.

However, the communication lighting technology may have a lower communication effect to pedestrians depending on external lighting conditions since it is difficult to distinguish lighting areas on the road surface even when headlights are turned on during bright daytime. In addition, the communication lighting technology may cause an increase in cost to manufacture a vehicle because a new lighting device needs to be installed on the vehicle to irradiate signs or the like to be transmitted to pedestrians on the road surface. Moreover, the communication lighting technology may not cause pedestrians to understand the process of non-verbal communication in autonomous vehicles because vehicle manufacturers utilize different communication lighting methods.

Therefore, there is a need for a technology that enables interaction with pedestrians while performing its original function using a device or a system (e.g., VESS system) already installed in a vehicle without installing a separate device (e.g., lighting device for communication) in the vehicle.

The related art of the present disclosure is disclosed in Korean Patent No. 10-0638960 (published on Oct. 19, 2006, entitled "Method and Apparatus for Directing Sound).

SUMMARY

Various embodiments are directed to an apparatus and method for controlling virtual engine sound, which use an annular array-shaped beam focusing directional speaker to change a sound focal point, thereby enabling the speaker to operate in a virtual engine sound system (VESS) mode or in a pedestrian communication mode in which a guidance sound is transmitted only to a specific position with pedestrians.

In an embodiment, there is provided an apparatus for controlling virtual engine sound, which includes a sensor unit configured to detect a position of a pedestrian in front of a vehicle, a speaker unit configured to output a virtual engine sound in all directions of the vehicle or output a sound guidance message only to the position of the pedestrian, and a control unit configured to cause the speaker unit to operate in either a virtual engine sound system (VESS) mode or a pedestrian communication mode in which the sound guidance message is transmitted only to the pedestrian's position, by changing a sound focal point output through the speaker unit.

The speaker unit may include an annular array-shaped beam focusing directional speaker.

The control unit may control an annular array-shaped beam focusing directional speaker to operate in the VESS mode to transmit the virtual engine sound in all directions, by forming the sound focal point inside the vehicle.

The control unit may adjust a delay time to transmit an output signal through each ultrasonic element of an annular array-shaped beam focusing directional speaker of the speaker unit in order to change the sound focal point.

In the VESS mode, the control unit may be configured to modulate the virtual engine sound with a specified sound modulation scheme to generate an output signal, to calculate a delay time to form the sound focal point inside the vehicle, and to apply the output signal to each ultrasound element of the speaker unit with a time difference corresponding to the delay time.

In the VESS mode, the control unit may adjust a level of the virtual engine sound depending on a vehicle speed.

In the pedestrian communication mode, the control unit may be configured to recognize the pedestrian's position, to modulate a specified guidance message with a specified sound modulation scheme to generate an output signal, to calculate a delay time to form the sound focal point in a pedestrian's ear, and to apply the output signal to each ultrasound element of the speaker unit with a time difference corresponding to the delay time.

The control unit may be configured to display the pedestrian's position as a bounding box by recognizing the pedestrian's position by a camera, to calculate a pedestrian's distance using the following Equation 1, and to calculate a top point of the bounding box that approximates a pedestrian's ear using the following Equation 2:

$$z = h_c f/(0.5H - \text{foot})p \qquad \text{[Equation 1]}$$

where hc is a height of the camera, f is a focal length, p is a pixel size, H is a height resolution of an image, and foot is a bottom height of the bounding box; and $$y = h_c + z(\text{height} - 0.5H)p/f \qquad \text{[Equation 1]}$$

where height is a top height of the bounding box, hc is a height of the camera, f is a focal length, p is a pixel size, and H is a height resolution of an image.

In another embodiment, there is provided a method of controlling virtual engine sound, which includes detecting, by a control unit, a position of a pedestrian in front of a vehicle through a sensor unit, and causing, by the control unit, a speaker unit to operate in either a virtual engine sound method (VESS) mode or a pedestrian communication mode in which a sound guidance message is transmitted only to the pedestrian's position, by changing a sound focal point output through the speaker unit.

The control unit may control an annular array-shaped beam focusing directional speaker to operate in the VESS mode to transmit a virtual engine sound in all directions, by forming the sound focal point inside the vehicle.

The control unit may adjust a delay time to transmit an output signal through each ultrasonic element of an annular array-shaped beam focusing directional speaker of the speaker unit in order to change the sound focal point.

In the VESS mode, the control unit may be configured to modulate a virtual engine sound with a specified sound modulation scheme to generate an output signal, to calculate a delay time to form the sound focal point inside the vehicle, and to apply the output signal to each ultrasound element of the speaker unit with a time difference corresponding to the delay time.

In order for the speaker unit to operate in the VESS mode, the control unit may adjust a level of a virtual engine sound depending on a vehicle speed.

In order for the speaker unit to operate in the pedestrian communication mode, the control unit may be configured to recognize the pedestrian's position, to modulate a specified guidance message with a specified sound modulation scheme to generate an output signal, to calculate a delay time to form the sound focal point in a pedestrian's ear, and to apply the output signal to each ultrasound element of the speaker unit with a time difference corresponding to the delay time.

In order to recognize the pedestrian's position, the control unit may be configured to display the pedestrian's position as a bounding box by recognizing the pedestrian's position by a camera, to calculate a pedestrian's distance using the following Equation 1, and to calculate a top point of the bounding box that approximates a pedestrian's ear using the following Equation 2:

$$z = h_c f/(0.5H - \text{foot})p \qquad \text{[Equation 1]}$$

where hc is a height of the camera, f is a focal length, p is a pixel size, H is a height resolution of an image, and foot is a bottom height of the bounding box; and $$y = h_c + z(\text{height} - 0.5H)p/f \qquad \text{[Equation 2]}$$

where height is a top height of the bounding box, hc is a height of the camera, f is a focal length, p is a pixel size, and H is a height resolution of an image.

As apparent from the above description, the apparatus and method for controlling virtual engine sound according to the present disclosure use the annular array-shaped beam focusing directional speaker to change the sound focal point, thereby enabling the speaker to operate in the virtual engine sound system (VESS) mode or in the pedestrian communication mode in which the guidance sound is transmitted only to the specific position with pedestrians.

DETAILED DESCRIPTION OF THE ILLUSTRATED EMBODIMENTS

Hereinafter, an apparatus and method for controlling virtual engine sound according to exemplary embodiments of the present disclosure will be described with reference to the accompanying drawings.

It should be considered that the thickness of each line or the size of each component in the drawings may be exaggeratedly illustrated for clarity and convenience of description. In addition, the terms used herein are terms defined in consideration of functions of the present disclosure, and these terms may change depending on the intention or practice of a user or an operator. Therefore, these terms should be defined based on the entirety of the disclosure set forth herein.

Figure 1:
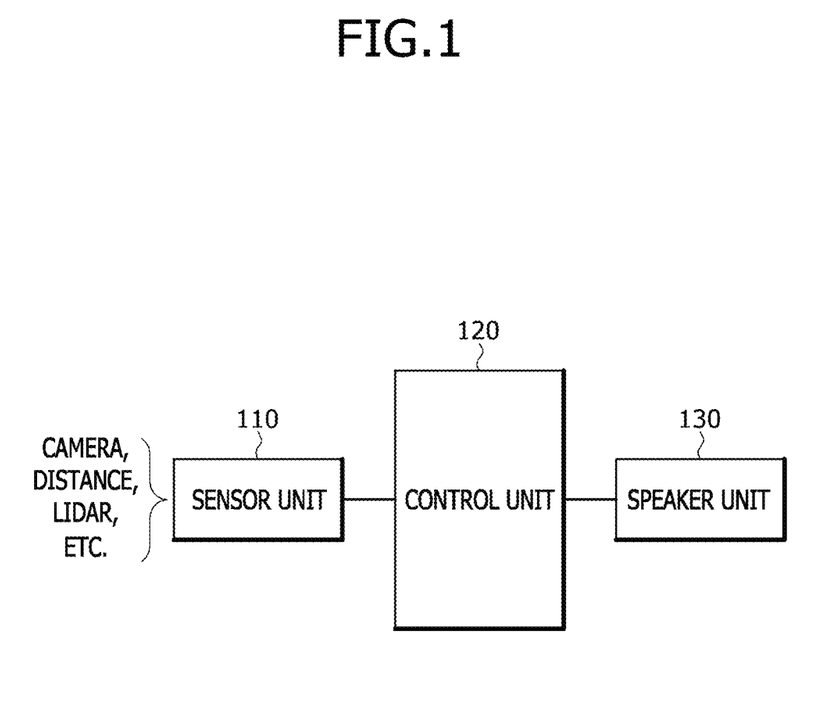
FIG. 1 is an exemplary diagram illustrating a schematic configuration of an apparatus for controlling virtual engine sound according to an embodiment of the present disclosure.

FIG. 1 is an exemplary diagram illustrating a schematic configuration of an apparatus for controlling virtual engine sound according to an embodiment of the present disclosure.

As illustrated in FIG. 1, the apparatus for controlling virtual engine sound according to the present embodiment includes a sensor unit 110, a control unit 120, and a speaker unit 130.

The sensor unit 110 includes at least one sensor (e.g., a camera sensor, a distance sensor, a LIDAR sensor, etc.) for detecting an obstacle in front of a vehicle.

The sensor unit 110 also detects a position of a pedestrian in front of the vehicle.

The speaker unit 130 includes an annular array-shaped beam focusing directional speaker.

For example, the speaker unit 130 is typically installed in a portion corresponding to an engine room of an internal combustion engine vehicle, but is not necessarily limited thereto.

The control unit 120 uses the annular array-shaped beam focusing directional speaker to change a sound focal point (i.e., note that it is not a directivity direction), thereby enabling the speaker to operate in a virtual engine sound system (VESS) mode or in a pedestrian communication mode in which a guidance sound is transmitted only to a specific position with pedestrians.

For example, the control unit 120 is able to control the annular array-shaped beam focusing directional speaker to operate in a VESS mode in which a warning sound (e.g., virtual engine sound) is transmitted in all directions, by forming a sound focal point inside the vehicle (for example, at the center of the speaker, inside a bumper, or the like). The control unit 120 is also able to control the speaker to operate in a pedestrian communication mode in which a guidance sound (i.e., sound guidance message) is transmitted only to a pedestrian's position (i.e., three-dimensional position) and a position of the pedestrian's ear (i.e., three-dimensional position), by detecting (calculating) those positions.

As such, the control unit 120 enables the speaker to operate in either the VESS mode or the pedestrian communication mode, thereby providing voice guidance only to a target pedestrian without an increase in city noise if necessary (e.g., by notifying a driver or an autonomous vehicle that a pedestrian is recognized). Accordingly, the pedestrian can clearly see whether the vehicle is stopped and can walk safely (for example, crossing a crosswalk, etc.).

In this case, since a delay time may be calculated by specification information or known technology of a speaker manufacturer, a detailed description of specific calculation thereof will be omitted in the present embodiment.

Hereinafter, the operation of the control unit 120 will be described with reference to FIGS. 2 to 5B.

Figure 2:
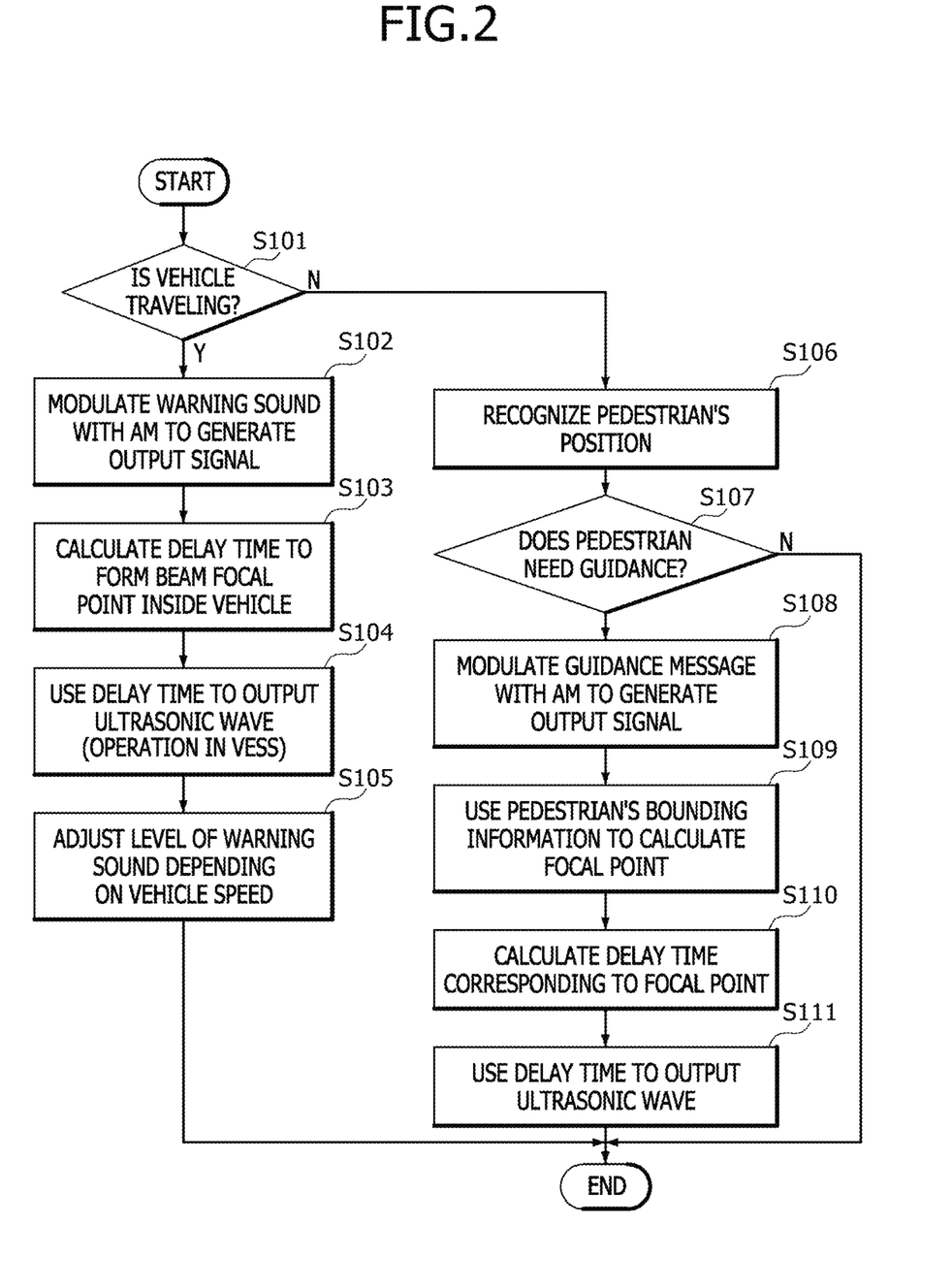
FIG. 2 is a flowchart for explaining a method of controlling virtual engine sound according to an embodiment of the present disclosure.

FIG. 2 is a flowchart for explaining a method of controlling virtual engine sound according to an embodiment of the present disclosure.

Referring to FIG. 2, if a vehicle is traveling (for example, at a specified driving speed or higher) (Yes in S101), a control unit 120 modulates a specified warning sound (e.g., virtual engine sound) with a specified sound modulation scheme (e.g., AM modulation scheme) to generate an output signal (S102).

Figure 3A:
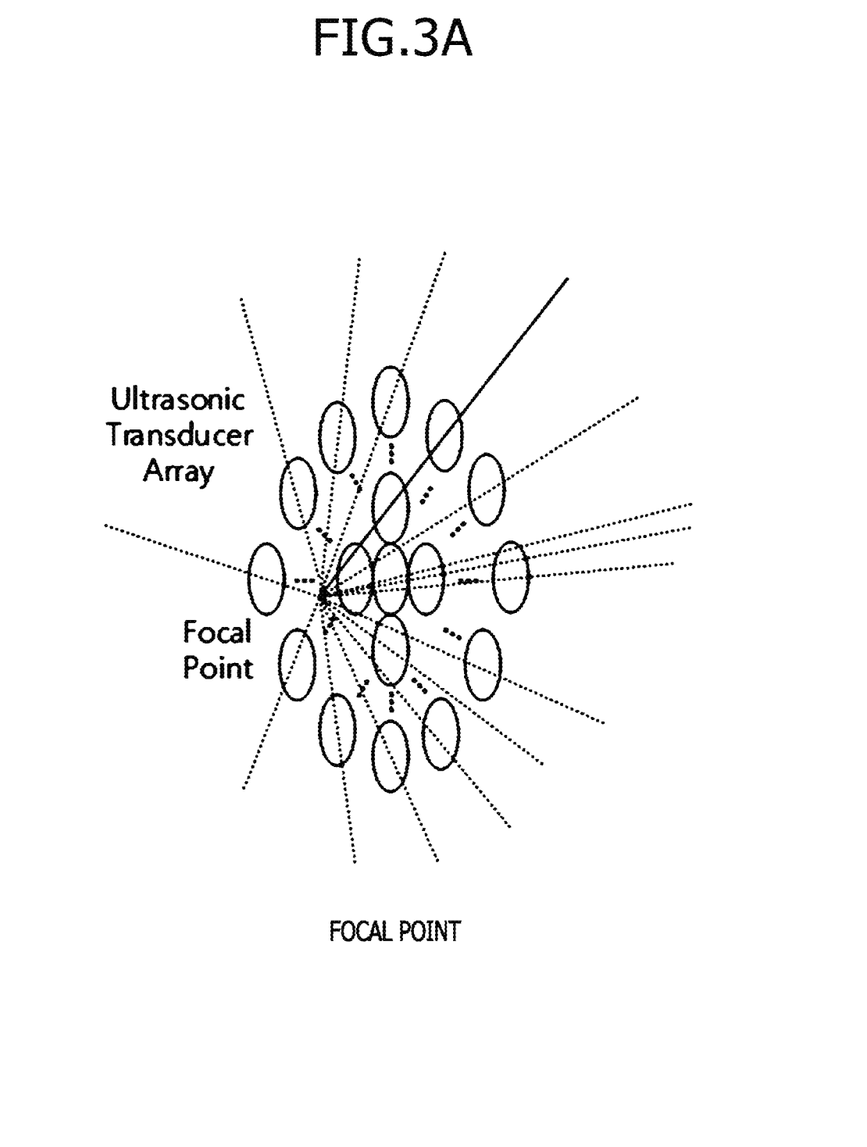
FIGS. 3A and 3B are exemplary views for explaining a method of using a delay time to transmit an output signal through each ultrasonic element of an annular array-shaped beam focusing directional speaker in order to form a beam focal point inside a vehicle in FIG. 2.
Figure 3B:
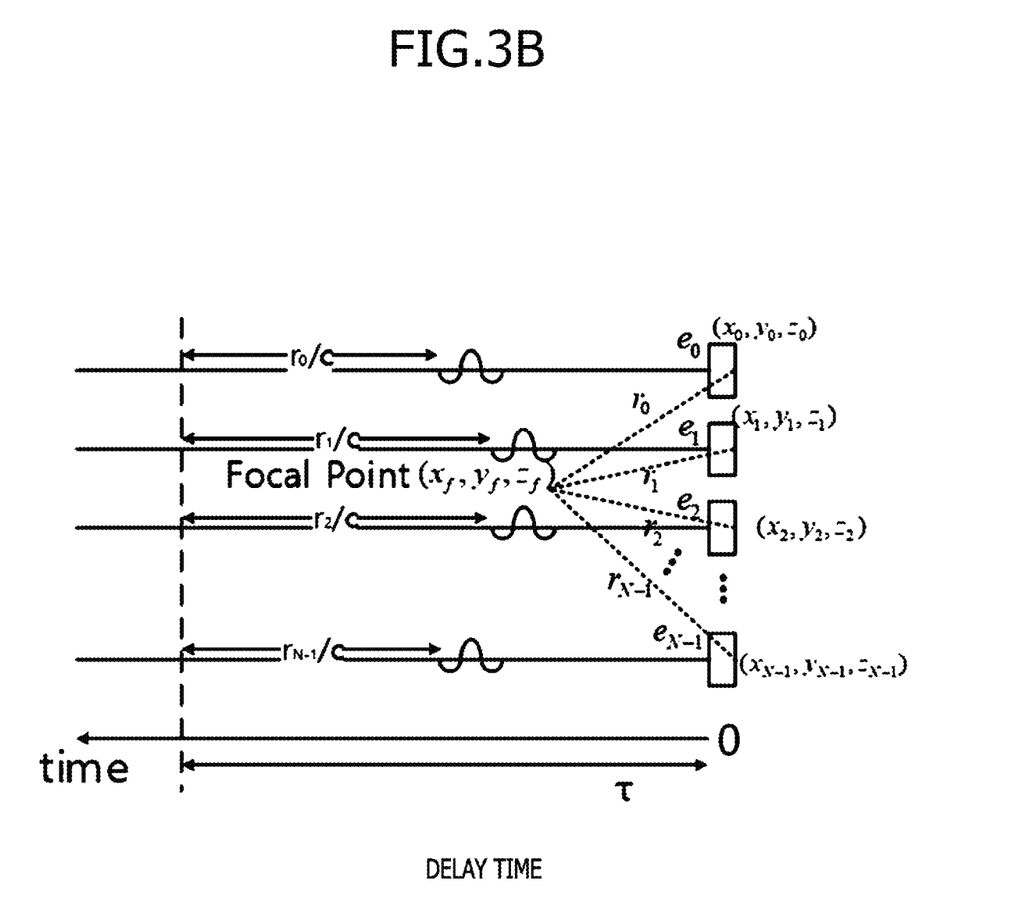

In addition, the control unit 120 calculates a delay time (i.e., delay time to transmit an output signal through each ultrasonic element of an annular array-shaped beam focusing directional speaker) in order to form a beam focal point (i.e., sound focal point) inside the vehicle (e.g., at the center of the speaker, inside a bumper, or the like) (S103) (see FIGS. 3A and 3B).

Furthermore, the control unit 120 uses the calculated delay time to apply the output signal to each ultrasound element of the annular array-shaped beam focusing directional speaker with a time difference corresponding to the delay time, thereby allowing the speaker to operate in the VESS mode in which a sound (i.e., virtual engine sound) is transmitted in all directions (S104).

FIGS. 3A and 3B are exemplary views for explaining a method of using a delay time to transmit an output signal through each ultrasonic element of the annular array-shaped beam focusing directional speaker (see FIG. 3B) in order to form the beam focal point (i.e., sound focal point) inside the vehicle (e.g., at the center of the speaker, inside the bumper, or the like) (see FIG. 3B) in FIG. 2.

As illustrated in FIGS. 3A and 3B, in order to form the beam focal point (sound focal point) inside the bumper in a typical vehicle driving situation, a delay time is applied to the output of each ultrasonic transducer (i.e., ultrasonic element) of a speaker unit 130 to apply an output signal with a time difference corresponding to the delay time so that the sound is transmitted in all directions. That is, if a sound is output to focus a beam (i.e., sound) inside the bumper to output a warning sound in all directions, a sound wave is transmitted in the form of a sphere so that the sound (e.g., virtual engine sound) is heard at the same level in all directions.

In this case, the control unit 120 may adjust the level of the warning sound (i.e., virtual engine sound) depending on the vehicle speed (S105).

Figure 5A:
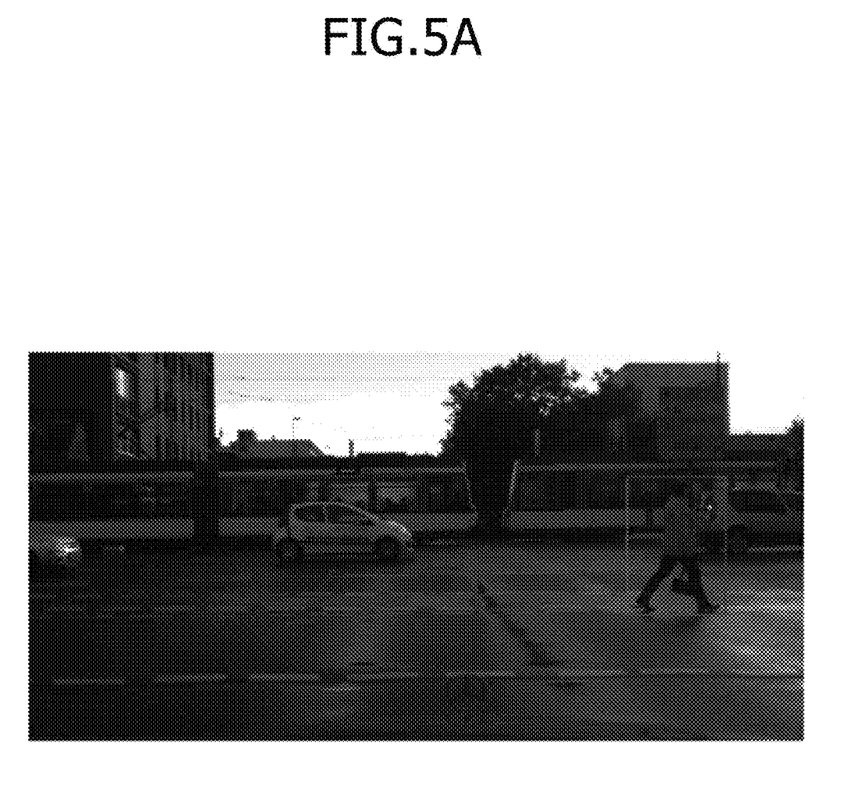
FIGS. 5A and 5B are exemplary views for explaining a method of recognizing a pedestrian's position based on a front camera in FIG. 2.
Figure 5B:
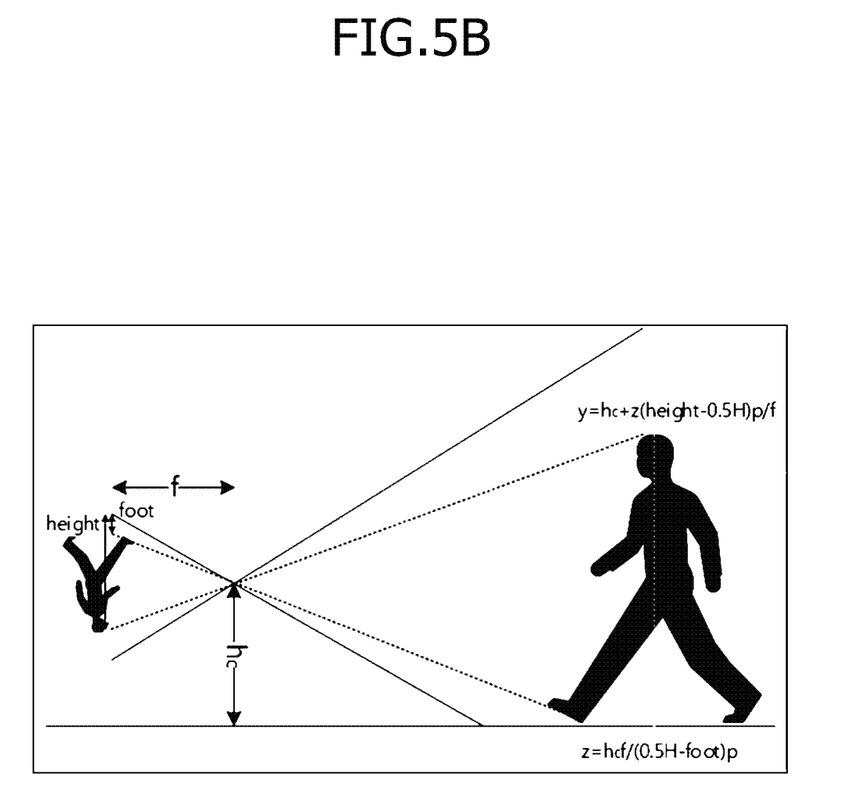

On the other hand, if the vehicle is not traveling (No in S101), the control unit 120 recognizes a pedestrian's position (i.e., a three-dimensional position) (S106) (see FIGS. 5A and 5B).

That is, the pedestrian's position (i.e., three-dimensional position) must be recognized because it is necessary to know the position of the pedestrian's ear in order to transmit a sound only to the pedestrian without causing noise in surrounding environments.

FIGS. 5A and 5B are exemplary views for explaining a method of recognizing a pedestrian's position based on a front camera in FIG. 2.

Referring to FIGS. 5A and 5B, the control unit 120 recognizes a pedestrian by a method of recognizing an object using a front camera, in which case pedestrian's position information is displayed as a bounding box as illustrated in FIG. 5A. When the camera is calibrated, a height hc, focal length f, and pixel size information p of the camera may be known. Therefore, a pedestrian's distance may be calculated with reference to FIGS. 5A and 5B and by the following Equation 1:

$$z = h_c f/(0.5H - \text{foot})p \quad \text{[Equation 1]}$$

where hc is the height of the camera, f is the focal length, p is the pixel size, H is the height resolution of the image, and foot is the bottom height of the bounding box.

Therefore, since the position of the pedestrian's ear may be calculated by the following Equation 2 since it approximates the top point of the bounding box:

$$y = h_c + z(\text{height} - 0.5H)p/f \quad \text{[Equation 2]}$$

where height is the top height of the bounding box, hc is the height of the camera, f is the focal length, p is the pixel size, and H is the height resolution of the image.

Accordingly, if the lateral angle of view of the camera is given as design information, a lateral position may also be obtained from the ratio of the lateral resolution of the image to the lateral center point of the pedestrian's bounding box.

Therefore, by obtaining a distance from the bottom information of the pedestrian's bounding box, specifying the height of the ear from the top information, and obtaining the angle from the lateral center point, it is possible to obtain beam focal point (i.e., sound focal point) information for transmitting a sound only to the pedestrian who need guidance without causing noise to other pedestrians.

If the pedestrian is a pedestrian who needs guidance (for example, if the pedestrian is in a position to cross the road in front of the vehicle) (Yes in S107), the control unit 120 modulates a specified guidance message (e.g., "cross first")

with a specified sound modulation scheme (e.g., AM modulation scheme) to generate an output signal (S108).

For example, if the control unit 120 sets a beam focal point (i.e., sound focal point) to a pedestrian, the speaker is operable in a communication mode in which the intention of the autonomous vehicle is transmitted to the pedestrian. For example, assuming that sound is g(t), a signal p(t) output from each ultrasonic element is expressed by the following Equation 3:

$$p(t)=p_0\sqrt{1+m\int\int g(t)dt}\sin(\omega_0 t) \qquad \text{[Equation 3]}$$

where t is the time, $w_0$ is the ultrasonic frequency, and $P_0$ and m are constants.

The control unit 120 calculates a beam focal point (i.e., sound focal point) (e.g., top point of the bounding box that approximates the position of the pedestrian's ear) based on the pedestrian's bounding box information (S109).

Figure 4A:
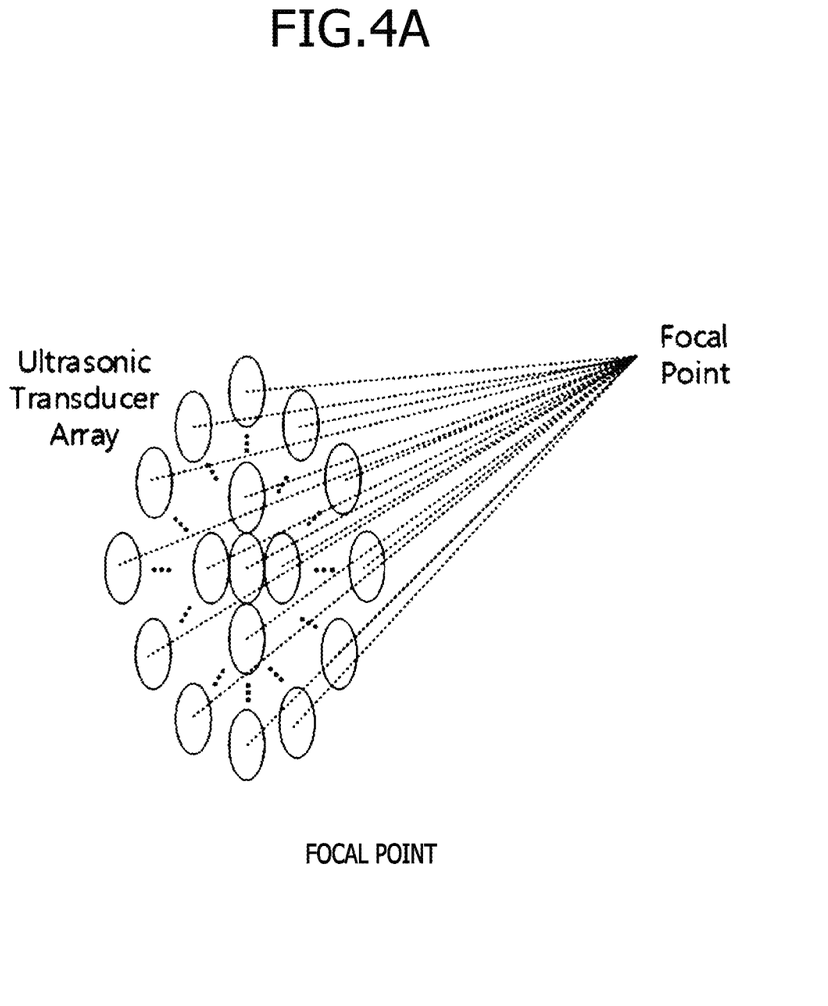
FIGS. 4A and 4B are exemplary views for explaining a method of using a delay time to transmit an output signal through each ultrasonic element of an annular array-shaped beam focusing directional speaker in order to form a beam focal point in a pedestrian's ear in FIG. 2.
Figure 4B:
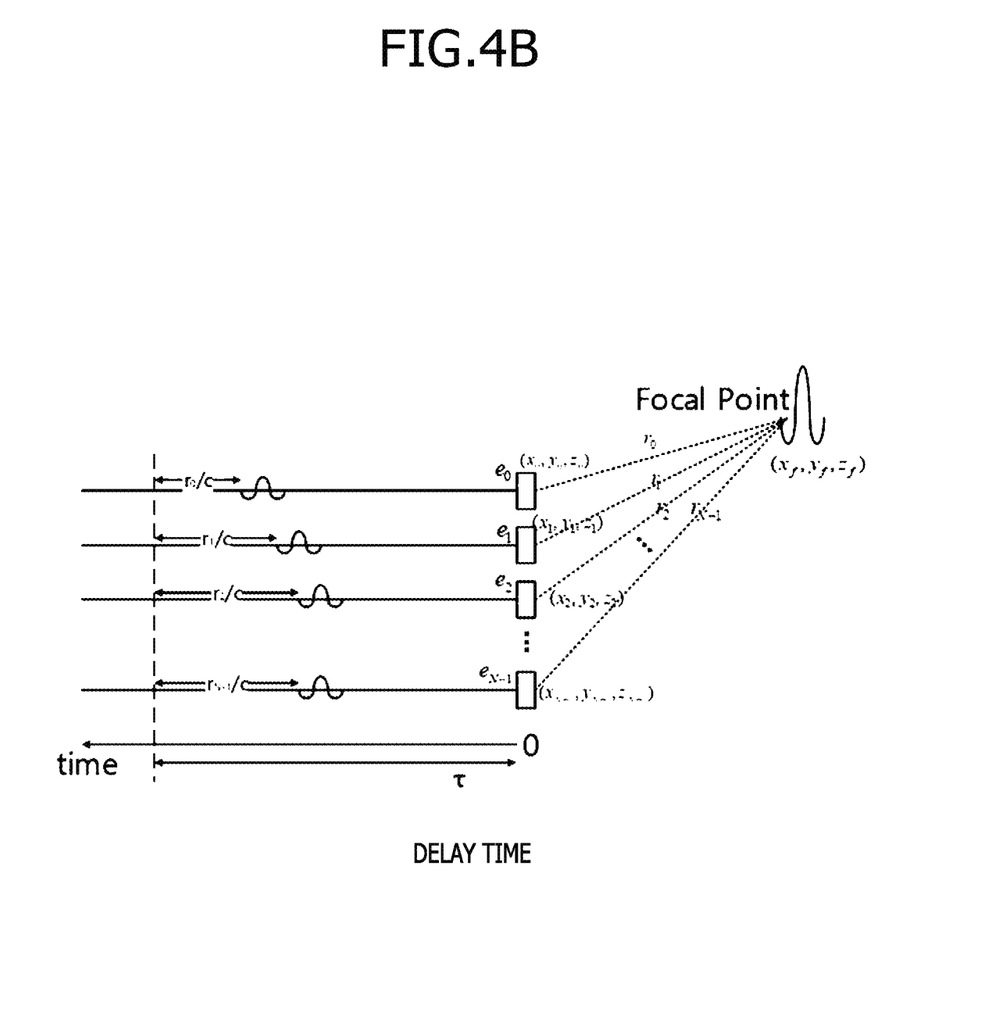

In addition, the control unit 120 calculates a delay time (i.e., delay time to transmit an output signal through each ultrasonic element of an annular array-shaped beam focusing directional speaker) in order to form a beam focal point (i.e., sound focal point) in the pedestrian's ear (actually, at the top point of the bounding box that approximates the position of the pedestrian's ear) (S110) (see FIGS. 4A and 4B).

Furthermore, the control unit 120 uses the calculated delay time to apply the output signal to each ultrasound element of the annular array-shaped beam focusing directional speaker with a time difference corresponding to the delay time, thereby allowing the speaker to operate in the pedestrian communication mode in which a sound (i.e., virtual engine sound) is transmitted to the pedestrian's ear (actually, at the top point of the bounding box that approximates the position of the pedestrian's ear) (S111).

FIGS. 4A and 4B are exemplary views for explaining a method of using a delay time to transmit an output signal through each ultrasonic element of the annular array-shaped beam focusing directional speaker (see FIG. 4B) in order to form the beam focal point (i.e., sound focal point) in the pedestrian's ear (see FIG. 4A) in FIG. 2.

As illustrated in FIGS. 4A and 4B, in order to form the beam focal point (sound focal point) in the pedestrian's ear in a typical vehicle driving situation, a delay time is applied to the output of each ultrasonic transducer (i.e., ultrasonic element) of a speaker unit 130 to apply an output signal with a time difference corresponding to the delay time so that the sound is transmitted to the pedestrian's ear. That is, if a sound is output to focus a beam (i.e., sound) on the pedestrian's ear, the beam (i.e., sound) is focused only at the pedestrian's position. Accordingly, since the sound increases only at that position and decreases at other locations, it does not cause noise or the like to other pedestrians.

As described above, it is possible to use the annular array-shaped beam focusing directional speaker to change the sound focal point, thereby enabling the speaker to operate in the virtual engine sound system (VESS) mode or in the pedestrian communication mode in which the guidance sound is transmitted only to the specific position with pedestrians.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims. Therefore, the technical protection scope of the present disclosure should be defined by the following claims. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (e.g., an apparatus or program). The apparatus may be implemented in, for example, appropriate hardware, software, and firmware. The method may be implemented in, for example, an apparatus such as a processor, which refers to a processing device in general, including, for example, a computer, a microprocessor, an integrated circuit, or a programmable logic device. The processor also includes communication devices such as computers, cell phones, portable/personal digital assistants ("PDAs"), and other devices that facilitate communication of information between end-users.

What is claimed is:

1. An apparatus for controlling virtual engine sound, comprising:
    a sensor unit configured to detect a position of a pedestrian in front of a vehicle;
    a speaker unit configured to output the virtual engine sound in all directions or output a sound guidance message only to the position of the pedestrian; and
    a control unit configured to cause the speaker unit to operate in either a virtual engine sound system (VESS) mode or a pedestrian communication mode in which the sound guidance message is transmitted only to the pedestrian's position, by changing a sound focal point output through the speaker unit,
    wherein, in the VESS mode, the control unit is configured to modulate the virtual engine sound with a specified sound modulation scheme to generate an output signal, to calculate a delay time to form the sound focal point inside the vehicle, and to apply the output signal to each ultrasound element of the speaker unit with a time difference corresponding to the delay time.

2. The apparatus according to claim 1, wherein the speaker unit comprises an annular array-shaped beam focusing directional speaker.

3. The apparatus according to claim 1, wherein, in the VESS mode, the control unit adjusts a level of the virtual engine sound depending on a vehicle speed.

4. An apparatus for controlling virtual engine sound, comprising:
    a sensor unit configured to detect a position of a pedestrian in front of a vehicle;
    a speaker unit configured to output the virtual engine sound in all directions or output a sound guidance message only to the position of the pedestrian; and
    a control unit configured to cause the speaker unit to operate in either a virtual engine sound system (VESS) mode or a pedestrian communication mode in which the sound guidance message is transmitted only to the pedestrian's position, by changing a sound focal point output through the speaker unit,
    wherein, in the pedestrian communication mode, the control unit is configured to:
        recognize the pedestrian's position;
        modulate a specified guidance message with a specified sound modulation scheme to generate an output signal;
        calculate a delay time to form the sound focal point in a pedestrian's ear, and apply the output signal to each ultrasound element of the speaker unit with a time difference corresponding to the delay time.

5. The apparatus according to claim 1, wherein the control unit is configured to:
   display the pedestrian's position as a bounding box by recognizing the pedestrian's position by a camera; and
   calculate a pedestrian's distance using Equation 1, and calculate a top point of the bounding box that approximates a pedestrian's ear using Equation 2:

$$z = h_c f / (0.5H - \text{foot}) p \qquad \text{[Equation 1]}$$

where hc is a height of the camera, f is a focal length, p is a pixel size, H is a height resolution of an image, and foot is a bottom height of the bounding box; and $$y = h_c + z(\text{height} - 0.5H) p / f \qquad \text{[Equation 2]}$$

where height is a top height of the bounding box, hc is a height of the camera, f is a focal length, p is a pixel size, and H is a height resolution of an image.

6. A method of controlling virtual engine sound, comprising:
   detecting, by a control unit, a position of a pedestrian in front of a vehicle through a sensor unit; and
   causing, by the control unit, a speaker unit to operate in either a virtual engine sound method (VESS) mode or a pedestrian communication mode in which a sound guidance message is transmitted only to the pedestrian's position by changing a sound focal point output through the speaker unit,
   wherein, in the VESS mode, the control unit is configured to modulate a virtual engine sound with a specified sound modulation scheme to generate an output signal, to calculate a delay time to form the sound focal point inside the vehicle, and to apply the output signal to each ultrasound element of the speaker unit with a time difference corresponding to the delay time.

7. The method according to claim 6, wherein, during the VESS mode, the control unit adjusts a level of a virtual engine sound depending on a vehicle speed.

8. The method according to claim 6,
   wherein the delay time is a first delay time, the specified sound modulation scheme is a first specified sound modulation scheme, and the output signal is a first output signal; and
   wherein, during the pedestrian communication mode, the control unit is configured to: recognize the pedestrian's position, to modulate a specified guidance message with a second specified sound modulation scheme to generate a second output signal, calculate a second delay time to form the sound focal point in a pedestrian's ear, and apply the second output signal to each ultrasound element of the speaker unit with a time difference corresponding to the second delay time.

9. The method according to claim 6, wherein, in order to recognize the pedestrian's position, the control unit is configured to:
   display the pedestrian's position as a bounding box by recognizing the pedestrian's position by a camera; and
   calculate a pedestrian's distance using Equation 1, and calculate a top point of the bounding box that approximates a pedestrian's ear using Equation 2:

$$z = h_c f / (0.5H - \text{foot}) p \qquad \text{[Equation 1]}$$

where hc is a height of the camera, f is a focal length, p is a pixel size, H is a height resolution of an image, and foot is a bottom height of the bounding box; and $$y = h_c + z(\text{height} - 0.5M) p / f \qquad \text{[Equation 2]}$$

where height is a top height of the bounding box, hc is a height of the camera, f is a focal length, p is a pixel size, and H is a height resolution of an image.

* * * * *